May 29, 1928.

J. W. HOOLEY 1,671,824

ELECTRIC SWITCHBOARD AND TEMPLATE STRUCTURE

Filed Sept. 27, 1927

Inventor:
John W. Hooley
by A. W. Harrison atty.

Patented May 29, 1928.

1,671,824

UNITED STATES PATENT OFFICE.

JOHN W. HOOLEY, OF LARCHMONT, NEW YORK.

ELECTRIC SWITCHBOARD AND TEMPLATE STRUCTURE.

Application filed September 27, 1927. Serial No. 222,260.

This invention relates to the means for supporting electrical switchboards and the various devices and connections employed in connection with the switches, and has particular reference to the installations in buildings which employ a large number or wide range of devices which require a multiplicity of conducting connections.

As explained in my former application Serial No. 136,717, filed September 20, 1926, and of which the present application is a continuation in part, it is customary in such installations as above referred to, to provide switchboards or panel boards of considerable height and to mount them rigidly in vertical position at such distance from the wall of the installation space as to provide ample room at the back of the uprights for an electrician to perform his work of installation or of making repairs or changes in the electrical devices or connections, the switches themselves being carried by the other or front side of the uprights.

Heretofore, so far as I am aware, the devices and conducting connections at the back of the uprights have been so relatively arranged as to present a maze which is neither neat nor workmanlike, the wires and other conducting elements crossing each other to such an extent as to cause a constant hazard of fire, besides possessing the possibility of mechanical or electrical injury to the members of the complete installations, either through a circuit grounding or trouble in one circuit affecting another circuit.

The principal object of my invention is to provide a structure for the purposes explained, in which structure the crossing of wires can be completely eliminated and in which the connections of all conductors can be conveniently made with the binding posts, distributing bars, bus bars, circuit switches, fuses, etc. I attain said object by providing certain plates or templates having openings for cables or cable conduits, which openings are formed in the templates before the latter are mounted in the positions which they are to occupy for use, so that the positioning of the conductors which are to pass through said openings is determined beforehand.

With the above stated object in view, the invention consists in the construction and combination of parts substantially as hereinafter described and claimed.

Of the accompanying drawings:—

Similar reference characters indicate similar parts or features in both views.

Figure 2:
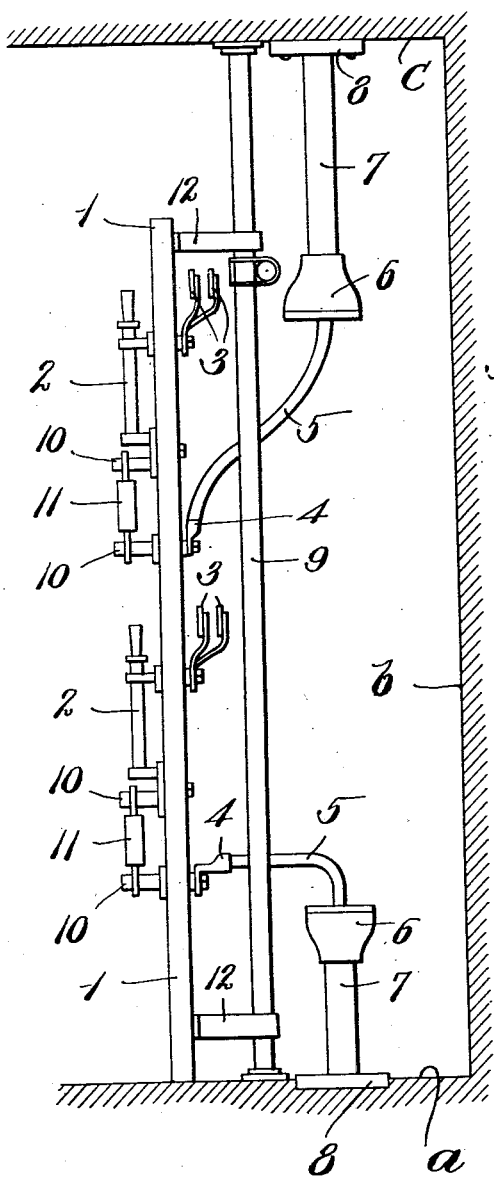
Figure 2 is an edge view of the same embodiment and indicating the switches and fuse mountings.
Figure 1:
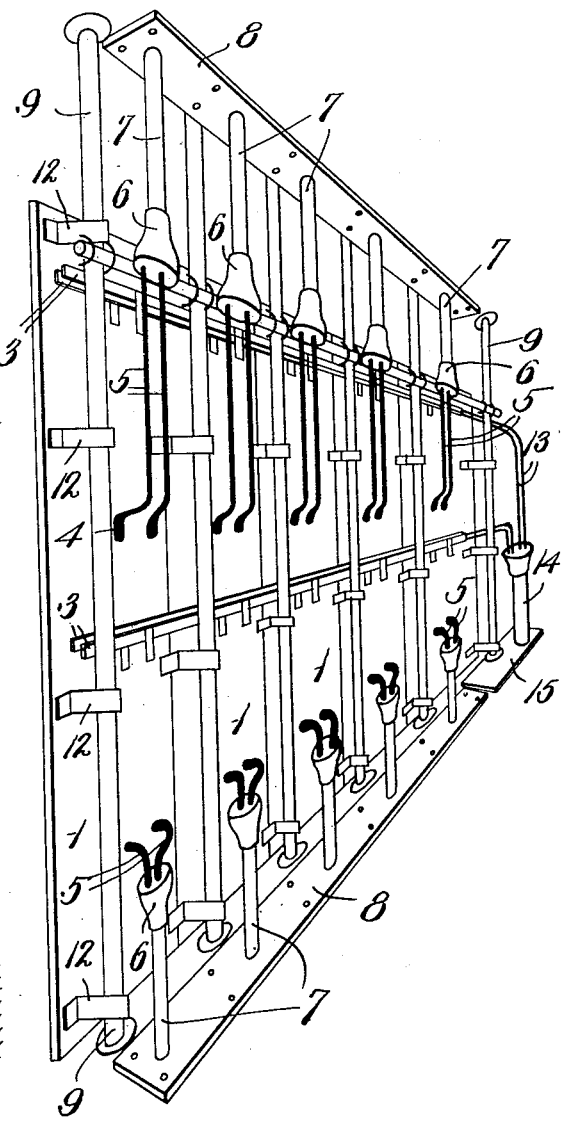
Figure 1 is a perspective view illustrating an embodiment of the invention.

Of the distributing boards or panel boards 1 there may be as many as desired and of any preferred width. They are usually mounted edge to edge as indicated in Figure 1, the number depending on the requirements of any particular installation. Mounted on their front faces are switches 2 of any preferred type, said switches having circuit connections through the boards or panels to bus bar conductors 3 fixedly mounted on the rear face of the panel boards. The usual clips 10 for the casings 11 of the fuses project from the front faces of the panel boards. Each lower clip 10 is connected by a conducting lug or coupling 4 at the rear of the panel with a cable 5 which is connected by a conduit fitting 6 with a conduit 7. The positioning of the conduits 7 is determined by openings in plates or templates 8 which constitute the important feature of my invention and the mounting and utility of which will presently be referred to more fully.

The panel or switch boards 1 are supported in any suitable way at the desired distance from the wall $b$, as by means of suitable rods 9 reaching from the floor $a$ to the ceiling $c$, with clips 12 connecting the boards and rods.

In Figure 1 the bus bars 3 are illustrated as connected to suitable wiring 13 leading through a conduit 14 which extends through a floor plate 15 similar to the floor template 8, or which might be an extension of the latter.

Detailed description of what electrical devices are connected by the several conducting elements illustrated and described is unnecessary since the invention relates, as has been stated, to the templates 8 which are manufactured and positioned preparatory to the setting up or completion of the particular installation required. The said templates 8, through which the conduits 7 pass, are illustrated as secured to the ceiling and floor of the room or compartment but which, without departing from my invention, might be secured at more or less distance from the ceiling or floor, or might be mounted on or near a side wall but still independent of the panel boards 1.

The templates 8 are manufactured and drilled or otherwise provided with the required holes for the conduits 7 and are set in position before the conduits are located. The positions of the holes in the templates are so arranged as to coordinate with the connections on the switch board panels 1 for the cables. In other words, the holes or openings in the templates, and the size and dimensions of the templates themselves will depend upon and be suited for the design of the required switchboard and the locations of the cable connections thereon.

The advantage of the templates 8 having openings in pre-selected locations is that the conduits will come through predetermined openings and will terminate so as to result in a neat and orderly and non-crossing relation between where the cables terminate from the conduits and the connections provided for on the switchboard. In other words, every cable leaving or terminating at a switchboard has a connection arranged for it on the switchboard so that all crossing of cables at the rear of the switchboard is avoided. The function of the plates 8, which may be of any approved material such as steel, asbestos, or fiber board, is to act as templates for the conduits 7. They steady said conduits and always maintain them and the fittings 6 in such positions relatively to the bus bars that no crossing of wires or conductors is ever required; and connections or repairs can be made without waste or time or risk of causing any short circuiting or grounding.

Having now described my invention, I claim:

1. An electrical mechanism of the character described, comprising an upright having electrical appliances on its front face, electric conducting devices at the rear of said upright, rigidly mounted templates permanently supported adjacent to said upright and independently thereof, conduits extending through the templates, and connections from said conduits to the said electric conducting devices.

2. An electric mechanism of the character described, comprising an upright having switch devices on its front face, electric conducting devices at the rear of said upright, rigidly mounted templates permanently supported adjacent the top and bottom of the space behind said upright and independent of said upright, conduits extending through the templates, and connections from said conduits to the said electric conducting devices.

3. The combination with a switchboard panel having switches on its front face, of a plate having apertures coordinating with the switch-controlled members of the panel, said plate being mounted in fixed position behind said panel and independently thereof, conduits in the apertures of said plate, and cables from said conduits to conducting devices at the rear of the panel.

4. The combination with a switchboard panel having switches on its front face, of upper and lower plates mounted independently of the panel above and below the space behind the panel, said plates having apertures positioned to accord with the conducting elements of the switches, conduits in the apertures of the plates, and cables from said conduits to conducting devices at the rear of the panel.

In testimony whereof I have affixed my signature.

JOHN W. HOOLEY.